United States Patent
Chen et al.

(10) Patent No.: US 11,681,647 B2
(45) Date of Patent: Jun. 20, 2023

(54) ELECTRONIC APPARATUS AND HOT-SWAPPABLE STORAGE DEVICE THEREOF

(71) Applicant: Wiwynn Corporation, New Taipei (TW)

(72) Inventors: Yi-Hao Chen, New Taipei (TW); Cheng Kuang Hsieh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 16/920,451

(22) Filed: Jul. 3, 2020

(65) Prior Publication Data

US 2021/0357349 A1 Nov. 18, 2021

(30) Foreign Application Priority Data

May 12, 2020 (TW) ................. 109115717

(51) Int. Cl.
*G06F 13/40* (2006.01)
*G06F 13/42* (2006.01)
(Continued)

(52) U.S. Cl.
CPC .......... *G06F 13/4081* (2013.01); *G06F 1/187* (2013.01); *G06F 1/3221* (2013.01);
(Continued)

(58) Field of Classification Search
None
See application file for complete search history.

(56) References Cited

U.S. PATENT DOCUMENTS 7,633,955 B1 * 12/2009 Saraiya ................. H04L 49/357
370/395.31
8,458,280 B2 * 6/2013 Hausauer ............ H04L 67/1097
709/212
(Continued)

FOREIGN PATENT DOCUMENTS

TW M432067 6/2012
TW M445713 1/2013
(Continued)

OTHER PUBLICATIONS

Office Action of Taiwan Counterpart Application, dated Sep. 17, 2021, pp. 1-10.
(Continued)

*Primary Examiner* — Henry Tsai
*Assistant Examiner* — Christopher A Bartels
(74) *Attorney, Agent, or Firm* — JCIPRNET

(57) ABSTRACT

An electronic apparatus and a hot-swappable storage device thereof are provided. The hot-swappable storage device includes a carrier, a connector, a controller, and a wireless communication interface. The carrier is configured to carry a plurality of storage components. The connector is configured to be electronically connected to a host end for performing a data transfer operation. The controller detects a connection status between the connector and the host end. The wireless communication interface decides whether to perform the data transfer operation according to the connection status.

10 Claims, 7 Drawing Sheets

(51) Int. Cl.
  *G06F 13/28* (2006.01)
  *G06F 1/3221* (2019.01)
  *G06F 1/18* (2006.01)
(52) U.S. Cl.
  CPC .......... *G06F 13/28* (2013.01); *G06F 13/4221* (2013.01); *G06F 2213/0026* (2013.01); *G06F 2213/0036* (2013.01)

(56) References Cited

U.S. PATENT DOCUMENTS

| | | | |
|---|---|---|---|
| 9,098,233 B2 | 8/2015 | Keffeler | |
| 9,958,178 B2* | 5/2018 | Palmer | G05B 15/02 |
| 10,248,328 B2* | 4/2019 | Lee | G06F 3/0646 |
| 10,642,764 B1* | 5/2020 | Gerhart | G06F 13/4282 |
| 10,929,320 B1* | 2/2021 | Chou | G06F 13/20 |
| 11,184,267 B2* | 11/2021 | Lorga | H04L 43/0858 |
| 11,256,644 B2* | 2/2022 | Mekad | G06F 13/4022 |
| 11,301,413 B2* | 4/2022 | Cheng | G06F 13/4295 |
| 2005/0097388 A1* | 5/2005 | Land | G06F 13/4022 714/5.1 |
| 2008/0307143 A1* | 12/2008 | Lin | G06F 13/385 710/302 |
| 2009/0109968 A1* | 4/2009 | Noy | H04L 45/60 370/389 |
| 2010/0060452 A1* | 3/2010 | Schuster | G06Q 10/08 340/572.1 |
| 2011/0218730 A1* | 9/2011 | Rider | G01C 21/3896 235/375 |
| 2011/0289263 A1* | 11/2011 | McWilliams | G06F 12/0802 711/E12.008 |
| 2012/0281558 A1* | 11/2012 | Anderson | H04W 88/06 370/252 |
| 2013/0120927 A1 | 5/2013 | Wen et al. | |
| 2014/0173332 A1* | 6/2014 | Bennah | G06F 11/2035 714/4.11 |
| 2014/0173336 A1* | 6/2014 | Bennah | G06F 11/2028 714/4.12 |
| 2014/0201400 A1* | 7/2014 | Beel | H04L 12/1822 710/63 |
| 2014/0204522 A1 | 7/2014 | Keffeler | |
| 2015/0373308 A1* | 12/2015 | Chen | H04N 5/772 348/148 |
| 2016/0179738 A1* | 6/2016 | Guddeti | G06F 13/24 714/56 |
| 2018/0279429 A1* | 9/2018 | Sadwick | F21K 9/27 |
| 2018/0317826 A1* | 11/2018 | Muhsin | G16H 40/67 |
| 2019/0147202 A1* | 5/2019 | Harney | H04B 1/3805 235/375 |
| 2019/0176837 A1* | 6/2019 | Williams | B60W 50/02 |
| 2019/0310685 A1* | 10/2019 | Steinmetz | H04W 12/08 |
| 2019/0360258 A1* | 11/2019 | Uemizo | E05B 19/00 |
| 2019/0388171 A1* | 12/2019 | Schermeier | A61B 50/13 |
| 2020/0073840 A1* | 3/2020 | Mekad | G06F 13/4022 |
| 2020/0345807 A1* | 11/2020 | Gallo | A61K 47/545 |
| 2021/0022236 A1* | 1/2021 | Iwakoke | H01J 37/32183 |
| 2022/0222492 A1* | 7/2022 | Guo | G06K 9/6262 |

FOREIGN PATENT DOCUMENTS

| | | |
|---|---|---|
| TW | 201403329 | 1/2014 |
| TW | 201430840 | 8/2014 |

OTHER PUBLICATIONS

"Office Action of Taiwan Counterpart Application", dated Sep. 7, 2022, p. 1-p. 14.

* cited by examiner

ELECTRONIC APPARATUS AND HOT-SWAPPABLE STORAGE DEVICE THEREOF

CROSS-REFERENCE TO RELATED APPLICATION

This application claims the priority benefit of Taiwan application serial no. 109115717, filed on May 12, 2020. The entirety of the above-mentioned patent application is hereby incorporated by reference herein and made a part of this specification.

BACKGROUND OF THE INVENTION

Field of the Invention

The invention relates to an electronic apparatus and a hot-swappable storage device thereof, and in particular to an electronic apparatus and a hot-swappable storage device thereof that may continuously perform data transfer.

Description of Related Art

Today's storage devices are usually configured in the form of drawers and have a hot-swap function. In the process of hot swapping, when the drawer is pulled out, data transfer between the host end and the hard disk may continue to be performed, so that the access of remote users is not affected. In the prior art, a signal cable with a certain length is connected between the host end (main board) and the storage device. When the drawer is pulled out, the signal cable may be pulled out with the drawer and maintain the connection between the host end and the storage device, and maintain the data transfer operation. However, the disadvantages of this architecture are that the signal cable has a certain size so that the chassis needs to have a certain length; the signal cable is not easy to manage and assemble, and in the process of pulling, entanglement readily occurs; and, a signal cable with a certain length is needed, so that data transfer needs to be performed via a signal cable with a longer path, thus affecting signal quality.

SUMMARY OF THE INVENTION

The invention provides an electronic apparatus and a hot-swappable storage device that may effectively maintain a data transfer operation.

The hot-swappable storage device of the invention includes a carrier, a connector, a controller, and a wireless communication interface. The carrier is configured to carry a plurality of storage components. The connector is disposed on the carrier and configured to be electronically connected to a host end for performing a data transfer operation. The controller is disposed in the carrier and coupled to the storage components. The controller detects a connection status between the connector and the host end. The wireless communication interface is disposed on the carrier and decides whether to perform the data transfer operation with the host end according to the connection status.

The electronic apparatus of the invention includes a host end and a hot-swappable storage device. The host includes a first connector, a first controller, and a first wireless communication interface. The first controller detects a connection status of the first connector. The first wireless communication interface decides whether to initiate a data transfer operation according to the connection status. The hot-swappable storage device includes a carrier, a second connector, a second controller, and a second wireless communication interface. The carrier is configured to carry a plurality of storage components. The second connector is configured to be electrically connected to the first connector of the host end for performing the data transfer operation. The second controller is disposed in the carrier and coupled to the storage components. The second controller detects a connection status of the second connector and the first connector. The second wireless communication interface is disposed on the carrier and decides whether to perform the data transfer operation with the host end according to the connection status. In particular, the first controller detects the connection status of the first connector and the second connector.

Based on the above, an embodiment of the invention provides a wireless communication interface in a hot-swappable storage device. After the hot-swappable storage device is separated from the host end, a data transfer operation is performed between the host end via the wireless communication interface. In this way, even in the repair status, when the hot-swappable storage device is pulled away from the host end and the physical connection with the host end is disconnected, data transfer may still be performed with the host end via the wireless communication interface to maintain normal operation of the system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
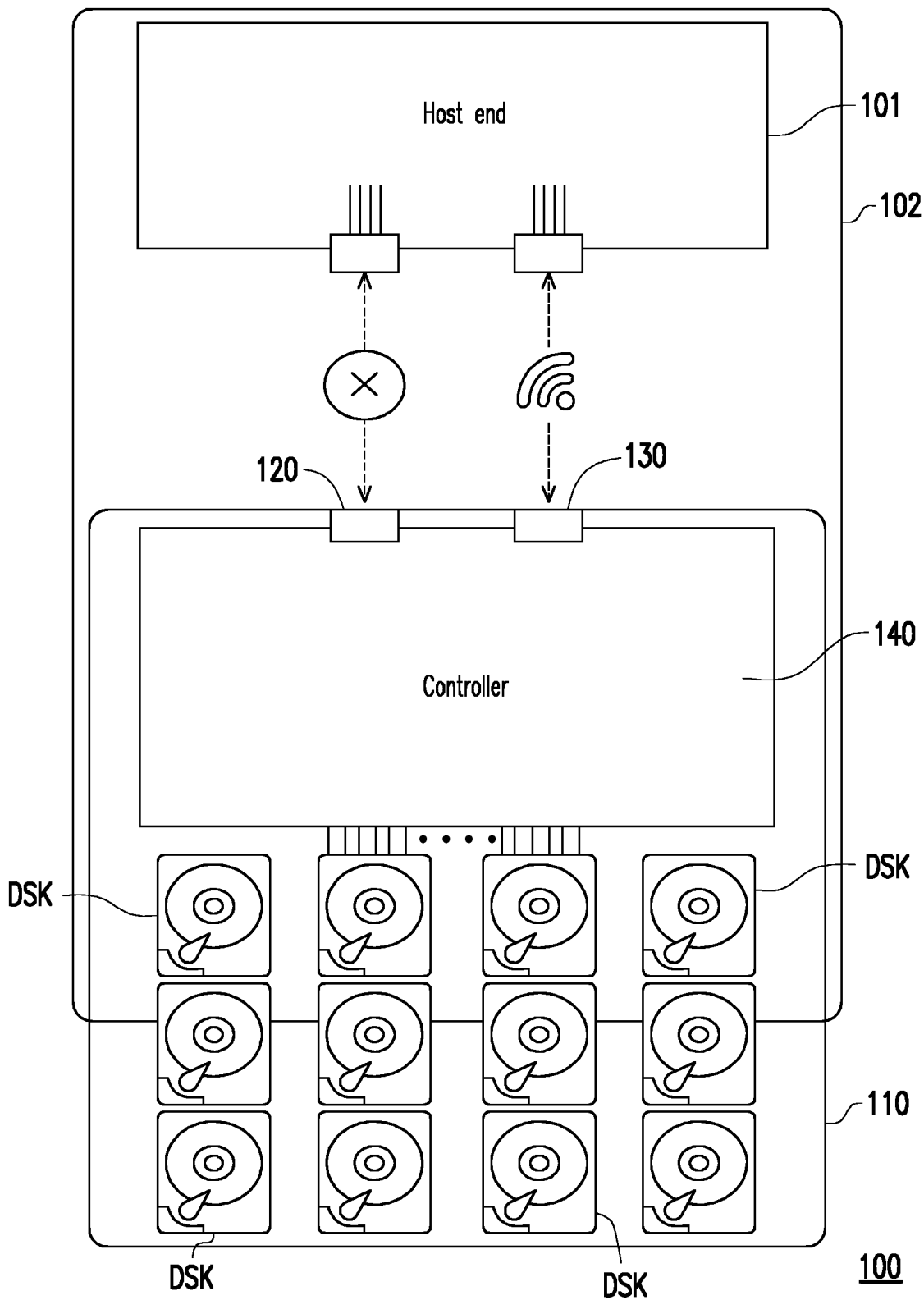
FIG. 1 is a diagram of an implementation of a hot-swappable storage device of an embodiment of the invention.
Figure 2:
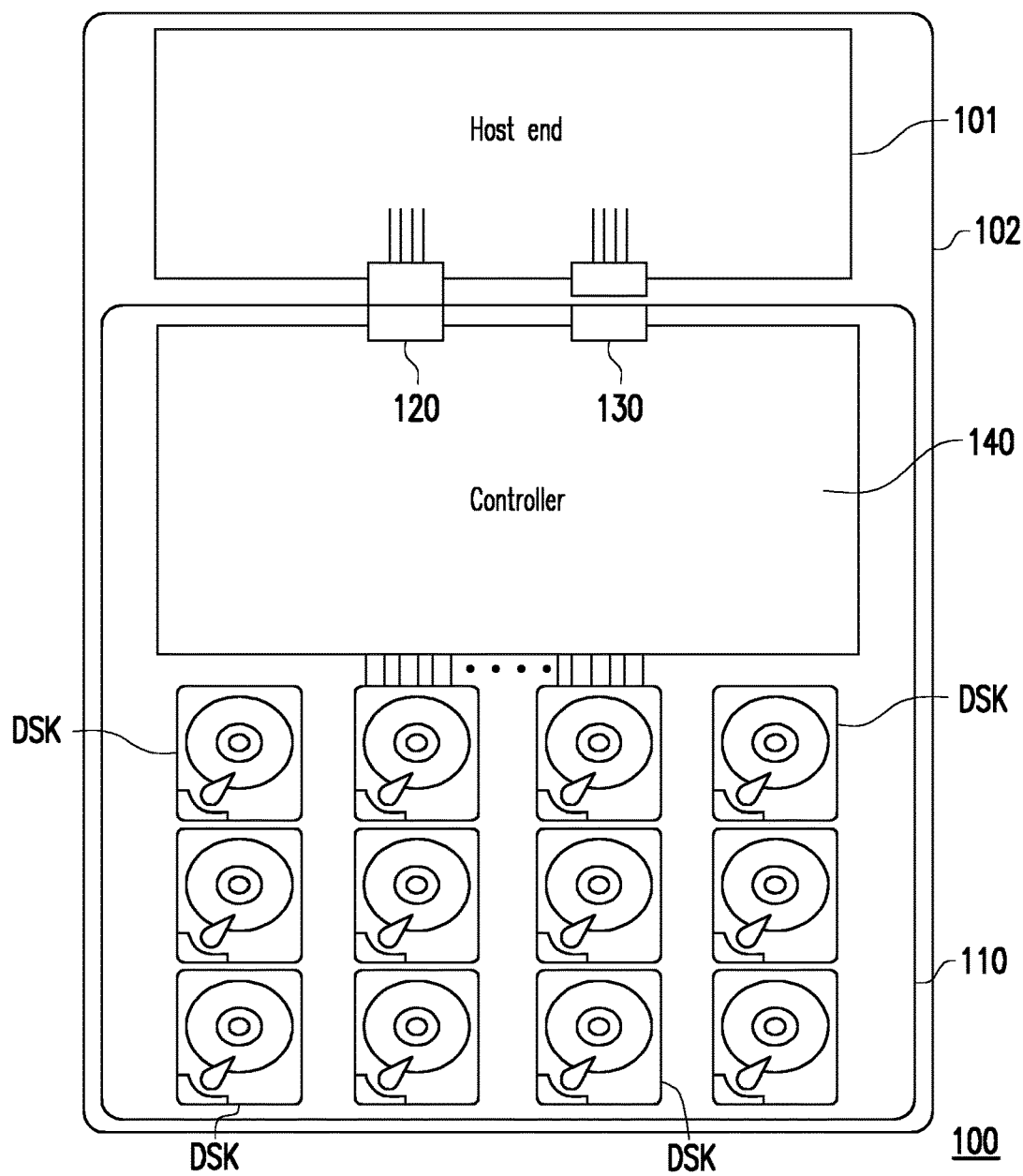
FIG. 2 is a diagram of the physical connection between a hot-swappable storage device and a host end of an embodiment of the invention.

Referring to FIG. 1, FIG. 1 is a diagram of an implementation of a hot-swappable storage device of an embodiment of the invention. A hot-swappable storage device 100 includes a carrier 110, a connector 120, a wireless communication interface 130, and a controller 140. The carrier 110 is configured to carry a plurality of storage components DSK. In the present embodiment, the storage components DSK may be hard drives in any form. The carrier 110 may further form a drawer configuration, and may be pushed in or pulled out on a rail 102. The carrier 110 is also provided with a connector 120, a wireless communication interface 130, and a controller 140 on top. Referring to FIG. 2, FIG. 2 is a diagram of the physical connection between a hot-swappable storage device and a host end of an embodiment of the invention. In particular, when the carrier 110 is in a pushed-in status, the connector 120 may be electrically (directly) connected to a connector on a host end 101, and a data transfer operation may be performed between the host end 101 and the storage components DSK via the connector 120. In this status, the wireless communication interface 130 may be turned off.

On the contrary, please refer to FIG. 1 again, when the carrier 110 is in a pulled-out status and the connector 120 and the host end 101 are physically separated, the controller 140 may detect the connection status of the connector 120 and the host end 101, and when the connector 120 and the host end 101 are physically separated, the data transfer operation between the host end 101 and the storage components DSK is performed via the wireless communication interface 130. That is to say, when the hot-swappable storage device 100 needs to be repaired, even if the carrier 110 is pulled out, the data transfer operation between the host end 101 and the storage components DSK may be continued.

Figure 3:
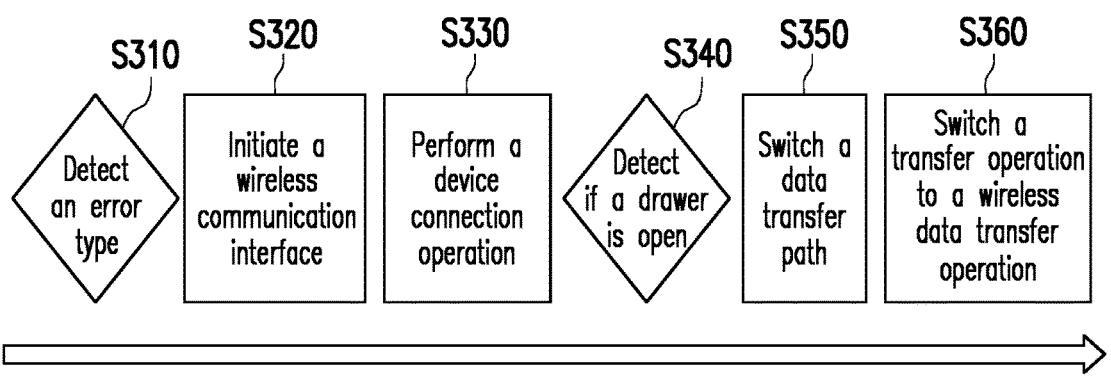
FIG. 3 is a diagram of an implementation of a transfer interface switching operation of an embodiment of the invention.

Next, please refer to FIG. 1 and FIG. 3 simultaneously. FIG. 3 is a diagram of an implementation of a transfer interface switching operation of an embodiment of the invention. In step S310, the controller 140 may detect the type of an error message sent by the host end 101. When the type of the error message is the type that indicates a repair is needed and the carrier 110 may need to be pulled out, step S320 is performed to initiate the wireless communication interface 130. Next, the wireless communication interface 130 may perform a device connection operation with the host end 101 (step S330), and the wireless communication interface 130 is connected to the host end 101.

It is worth mentioning that in steps S320 and S330, the carrier 110 may still be connected, that is, at this time, the connector 120 may maintain electrical connection with the host end 101.

In step S340, the controller 140 may determine whether the carrier 110 (drawer) is opened by detecting whether the connector 120 is electrically connected to the host end 101. When the drawer is opened, the controller 140 performs the operation of switching the data transfer path in step S350, and in step S360, the switching data transfer operation is the wireless data transfer operation performed by the wireless communication interface 130.

Please note that the wireless communication interface 130 may perform the device connection operation with the host end 101 before the drawer (the carrier 110) is opened. Therefore, once the drawer (the carrier 110) is opened, the wireless communication interface 130 may immediately replace the connector 120 to maintain the data transfer operation.

Figure 4:
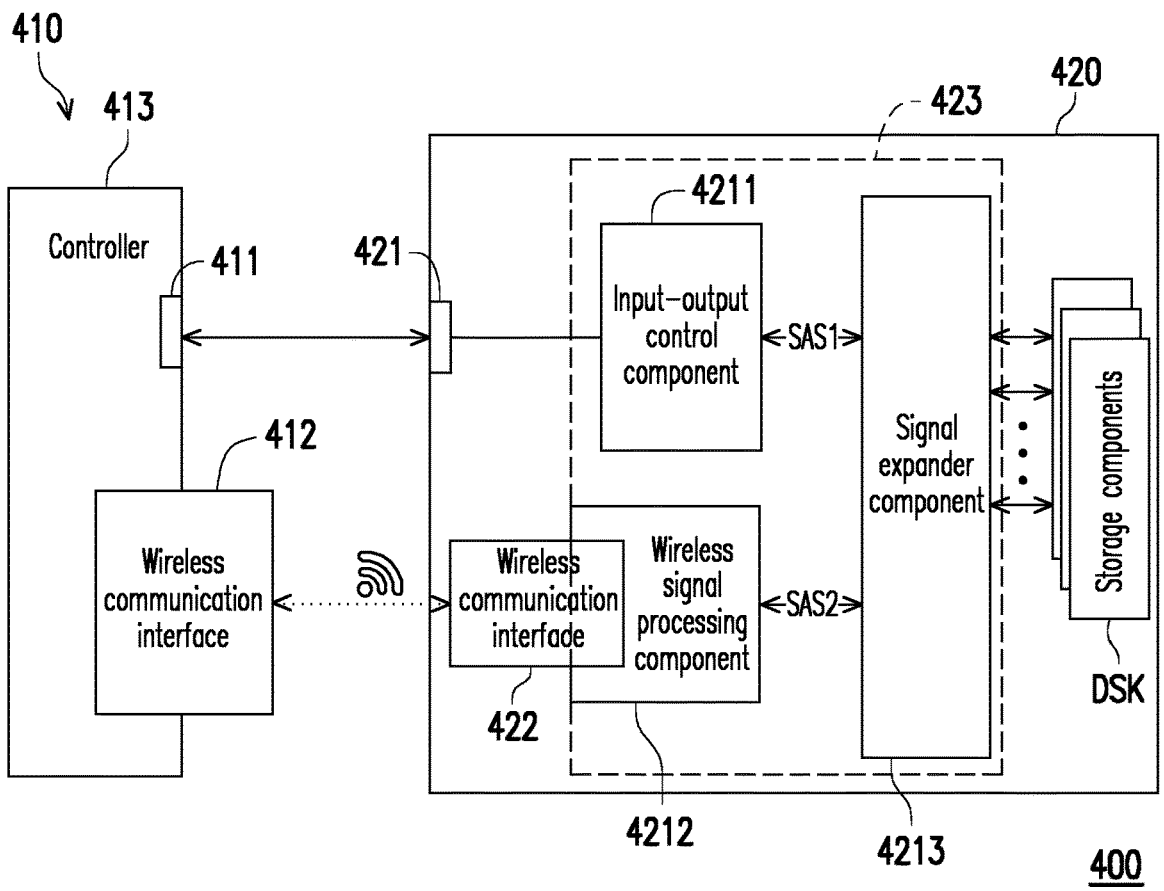
FIG. 4 is a diagram of an electronic apparatus of an embodiment of the invention.

Next, please refer to FIG. 4. FIG. 4 is a diagram of an electronic apparatus according to an embodiment of the invention. An electronic apparatus 400 includes a host end 410 and a hot-swappable storage device 420. The host end 410 includes a connector 411, a wireless communication interface 412, and a controller 413. The hot-swappable storage device 420 includes a connector 421, a wireless communication interface 422, a controller 423, and the storage components DSK. The controller 423 includes an input-output control component 4211, a wireless signal processing component 4212, and a signal expander component 4213. The input-output control component 4211 is coupled to the connector 421. The input-output control component 4211 is configured to transfer the transfer data of a Peripheral Component Interconnect Express (PCIe), and performs the transfer operation of a data SAS1 with the signal expander component 4213. The wireless signal processing component 4212 is coupled to the wireless communication interface 422 and configured to transfer wireless transfer data, and performs the transfer operation of a data SAS2 with the signal expander component 4213. In particular, the data SAS1 and SAS2 may both be transfer data of serial attached SCSI (SAS). The signal expander component 4213 is coupled to the input-output control component 4211, the wireless signal processing component 4212, and the storage components DSK, and performs the transfer and receiving operations of the data SAS1 or SAS2.

In terms of implementation details, when the host end 410 and the hot-swappable storage device 420 are electrically connected to each other via the connectors 411 and 421, a data transfer operation may be performed between the host end 410 and the hot-swappable storage device 420 via the data transfer path formed by the connectors 411 and 421.

Moreover, the host end 410 may send a repair request signal according to the working status of the hot-swappable storage device 420, and the controller 413 correspondingly starts the wireless communication interface 412. When the controller 423 receives the repair request signal, the controller 423 may first initiate the wireless communication interface 422. Between the wireless communication interfaces 412 and 422, the device connection operation between the host end 410 and the hot-swappable storage device 420 may be performed. After the device connection operation is completed, the host end 410 and the hot-swappable storage device 420 are in a connected status.

Then, the controllers 413 and 423 may simultaneously detect the electrical connection status between the connectors 411 and 421. Once the controllers 413 and 423 detect that the electrical connection between the connectors 411 and 421 is disconnected, the controllers 413 and 423 may respectively switch the data transfer path between the host end 410 and the hot-swappable storage device 420, and make the wireless communication interfaces 412 and 422 perform a wireless data transfer operation.

Please note that the wireless communication interfaces 412 and 422 may perform the data transfer operation via Light Fidelity (LiFi), Wireless Fidelity (WiFi), or Bluetooth communication. Here, based on the host end 410 and the hot-swappable storage device 420, an opaque housing space may be formed, and the wireless communication interfaces 412 and 422 may be housed in the housed space at the same time. Therefore, the data transfer operation between the wireless communication interfaces 412 and 422 is performed via LiFi to avoid the interference of ambient light and effectively maintain the quality of transferred data.

Figure 5:
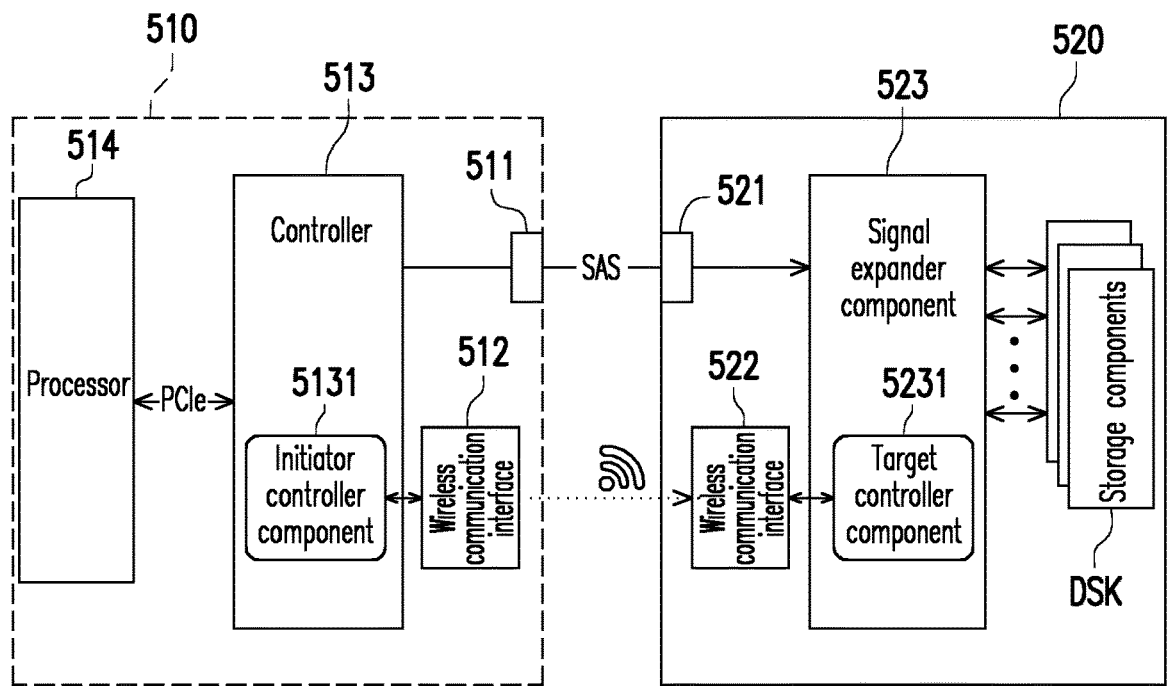
FIG. 5 is a diagram of an electronic apparatus of an embodiment of the invention.

Next, please refer to FIG. 5. FIG. 5 is a diagram of an electronic apparatus according to an embodiment of the invention. An electronic apparatus 500 includes a host end 510 and a hot-swappable storage device 520. The host end 510 includes a processor 514, a connector 511, a wireless communication interface 512, and a controller 513. The hot-swappable storage device 520 includes a connector 521, a wireless communication interface 522, a signal expander component 523, and the storage components DSK. Unlike the embodiment of FIG. 4, the connectors 511 and 521 in the present embodiment perform a data transfer operation of a Serial Attached SCSI (SAS). A data transfer operation of a Peripheral Component Interconnect Express (PCIe) may be performed between the processor 514 and the controller 513. In addition, the controller 513 includes an initiator controller component 5131 to initiate the wireless communication interface 512 and perform a data transfer and receiving operation thereof. In the present embodiment, the controller 513 may be an input-output controller of the processor 514.

In addition, the signal expander component 523 is used as a controller of the hot-swappable storage device 520. The signal expander component 523 also includes a target controller component 5231 configured to control the operation of the wireless communication interface 522.

In the present embodiment, both the initiator controller component 5131 and the target controller component 5231 may be implemented using hardware circuits known in the art, and there is no particular limitation.

Figure 6A:
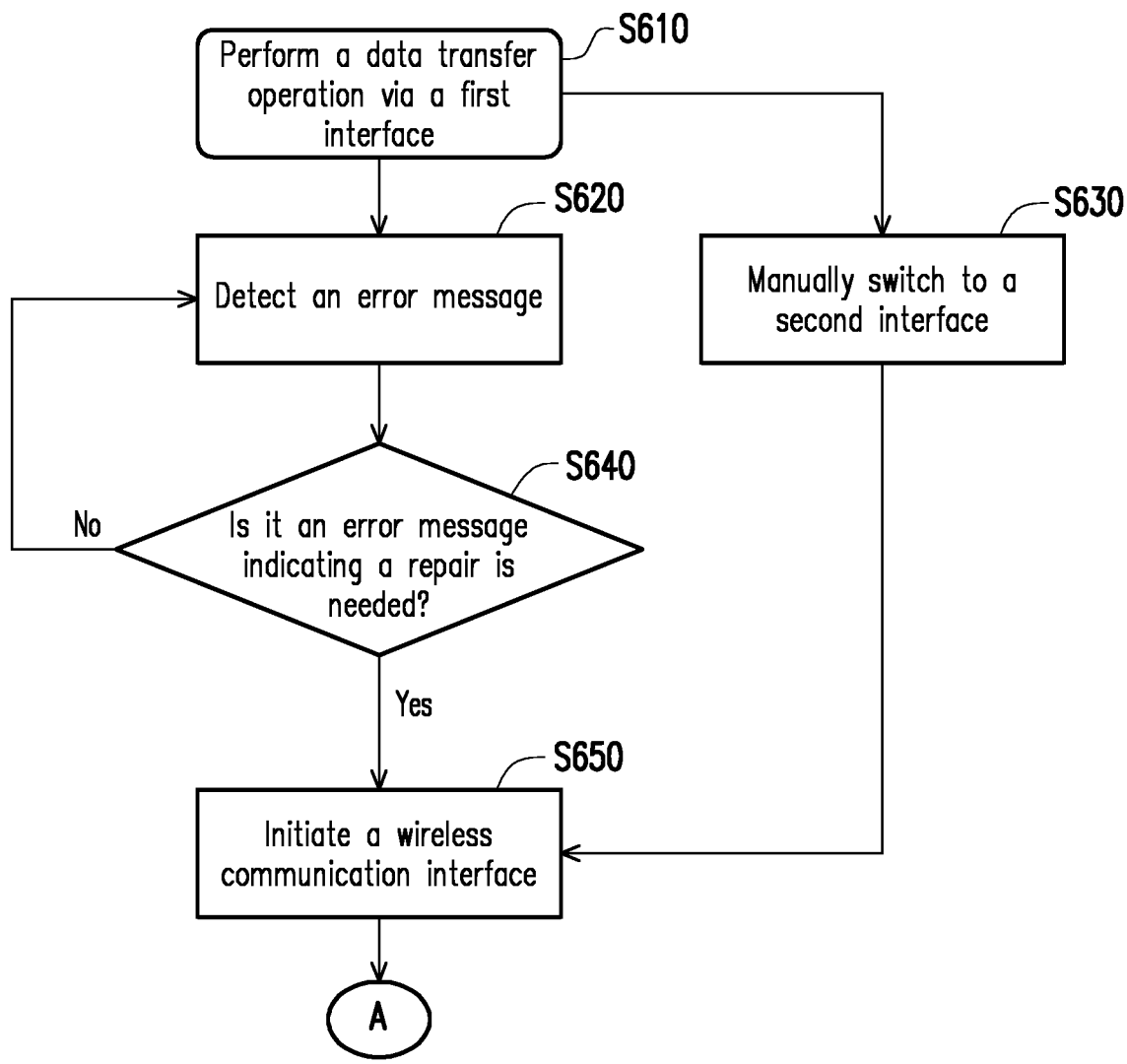
FIG. 6A to FIG. 6C are flowcharts of a control method of a data transfer operation of an electronic apparatus of an embodiment of the invention.
Figure 6B:
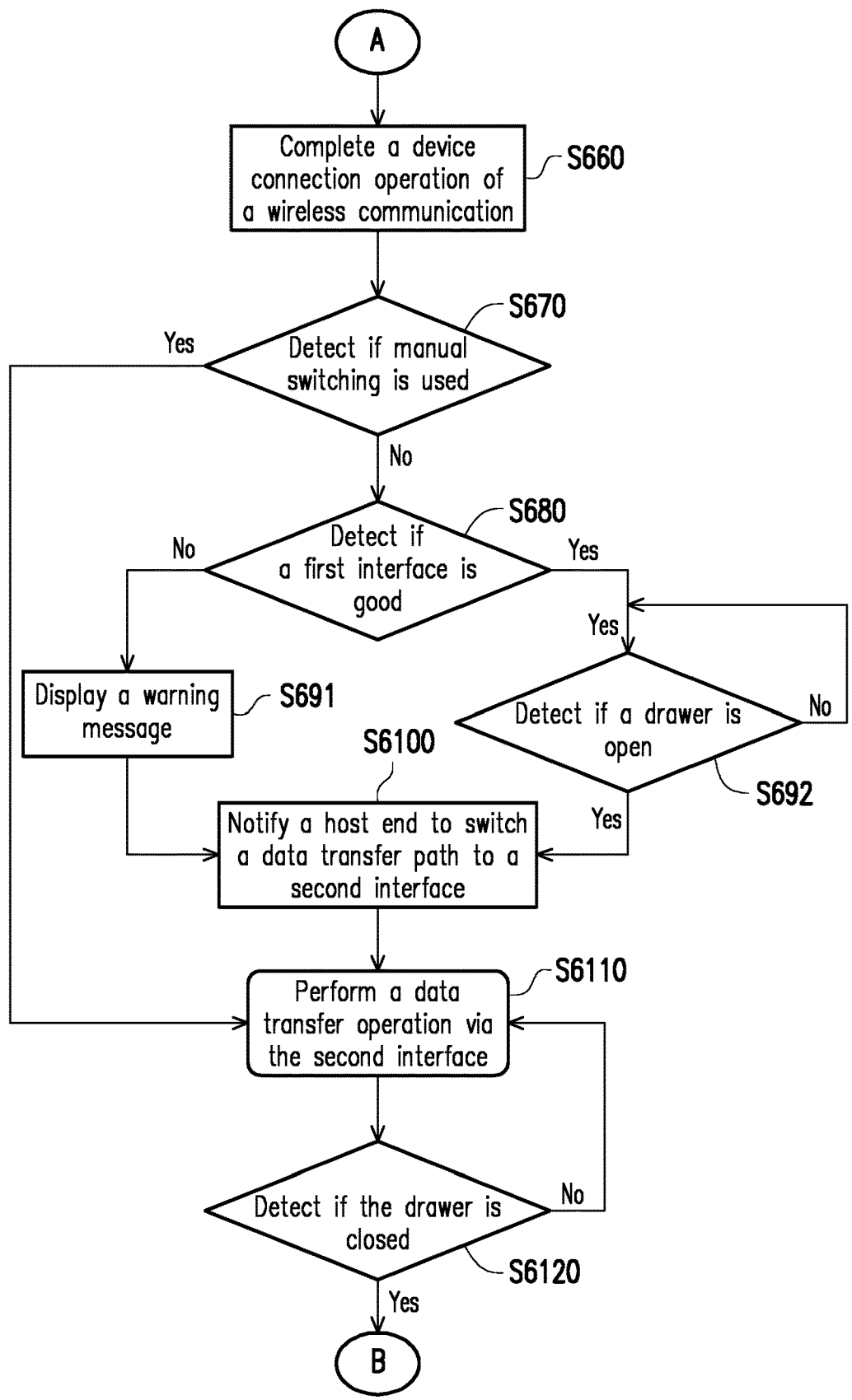
Figure 6C:
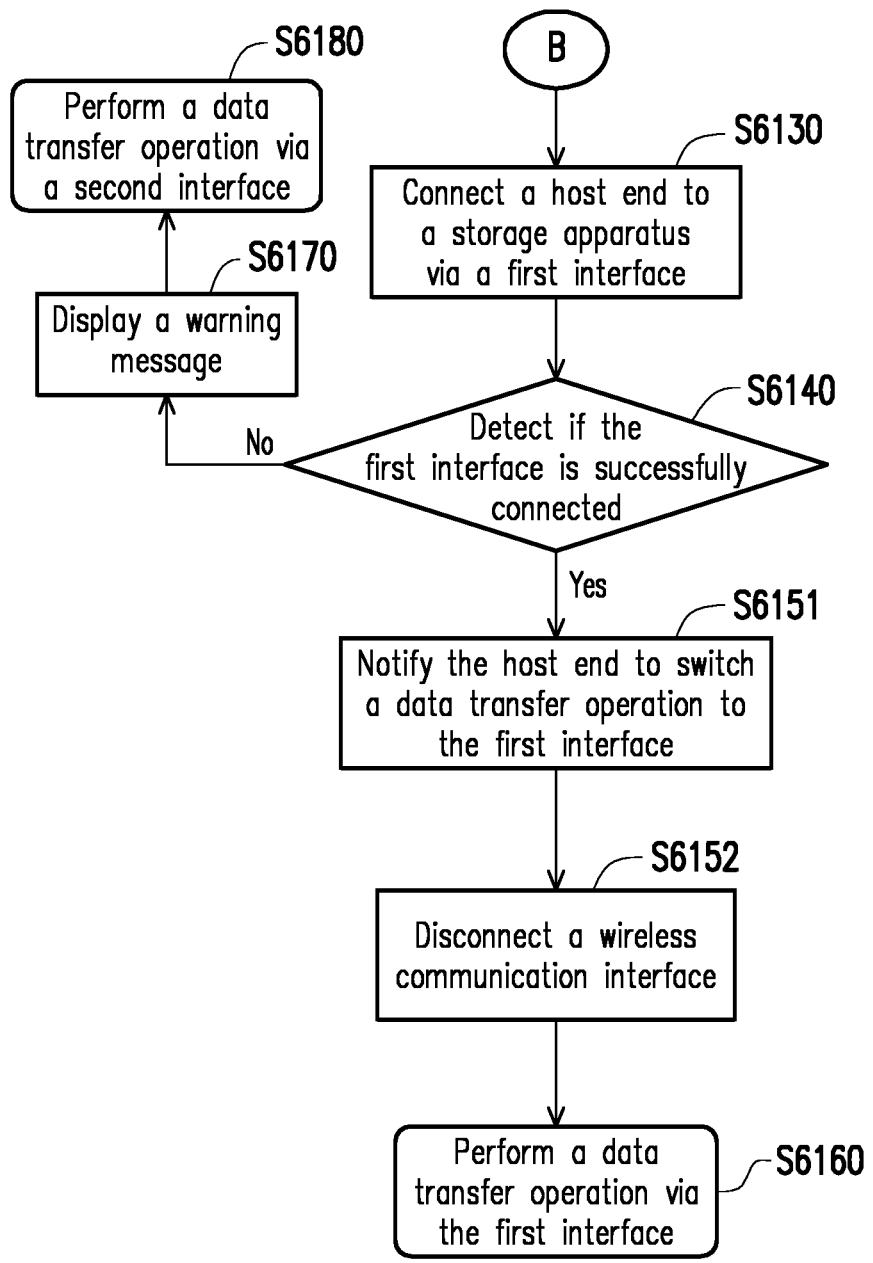

Refer to FIG. 6A to FIG. 6C below. FIG. 6A to FIG. 6C are flowcharts of a control method of a data transfer operation of an electronic apparatus of an embodiment of the invention. Please refer to FIG. 6A first. In step S610, a host end and a hot-swappable storage device may perform a data transfer operation via a first interface. Here, the first interface may be a transfer interface formed by the host end and connectors of the hot-swappable storage device electrically connected to each other.

In step S620, the hot-swappable storage device detects an error message sent by the host end, and in step S640, determines whether the error message is an error message indicating a repair is needed. In particular, the hot-swappable storage device may determine whether the error message is an error message indicating a repair is needed by checking if the received error message is on a white list. The white list is a pre-set list for recording error messages indicating a repair operation is not needed. Therefore, when the determination result of step S640 is on the white list, step S620 is repeated, and when the determination result of step S640 is not on the white list, step S650 is performed.

In step S650, a wireless communication interface may be initiated to enter a node A.

Moreover, in the present embodiment of the invention, the switching operation of the data transfer may be manually performed via step S630, and the data transfer may be switched from the first interface to the second interface. Here, the second interface is formed by the wireless communication interface of the host end and the hot-swappable storage device. After step S630, step S650 may be performed to initiate the wireless communication interface.

In FIG. 6B, following the node A, step S660 completes the device connection operation performed between the host end and the wireless communication interface of the hot-swappable storage device. In step S670, whether the current switching operation of the communication interface is caused by manual switching is detected, and if so, step S6110 is performed, otherwise, step S680 is performed.

In step S680, a detection operation may be performed for the data transfer status of the first interface to determine if the first interface is good. This determination operation may be performed by the host end, and when the first interface is determined to be not good, step S691 is performed to display a warning message. Or, when the first interface is determined to be good, step S692 is performed.

In step S692, whether a drawer (carrier) housing the hot-swappable storage device is opened may be determined. The detection operation may be performed synchronously in the host end and in the hot-swappable storage device. If the drawer is not opened, step S692 may be repeated. Once the drawer is detected to be open, step S6100 is performed and the host end is notified to switch the data transfer interface to the second interface. Moreover, after the warning message display operation of step S691, step S6100 may also be performed to notify the host end to switch the data transfer interface to the second interface.

In step S6110, a data transfer operation is performed between the host end and the hot-swappable storage device via the second interface, and in step S6120, the host end and the hot-swappable storage device may detect whether the drawer is closed. If the drawer is detected to be closed in step S6120, a node B is entered; on the contrary, if the drawer is detected to not be closed in step S6120, step S6110 is continued.

In FIG. 6C, following the node B, in step S6130, when the drawer is closed, the host end may be electrically connected to the hot-swappable storage device via the first interface. In step S6140, whether the first interface is successfully connected is determined. If the connection of the first interface is determined to be successfully completed, step S6151 may be performed; on the contrary, if the connection of the first interface is determined to not be successfully completed, step S6170 is performed to display a warning message, and in step S6180, the host end and the hot-swappable storage device perform the data transfer operation via the second interface.

Moreover, after the connection of the first interface is successfully completed, in step S6151, the host end is notified to switch the data transfer operation to the first interface, and in step S6152, the power of the wireless communication interface is cut off to reduce power consumption. In step S6160, the data transfer operation between the host end and the hot-swappable storage device is performed again via the first interface.

Figure 7:
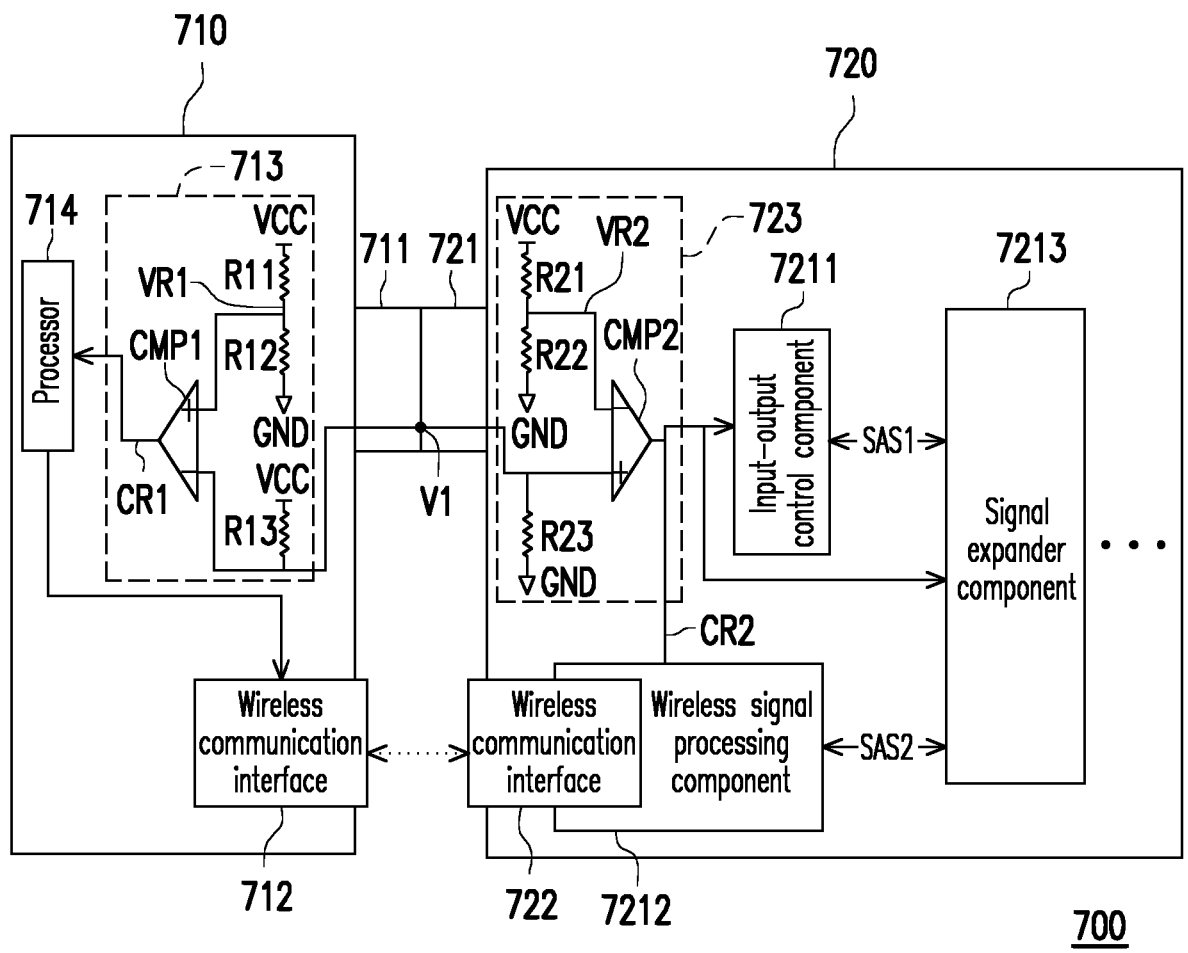
FIG. 7 is a diagram of a detection operation of a connection status between a host end and a hot-swappable storage device of an embodiment of the invention.

Refer to FIG. 7 below. FIG. 7 is a diagram of a detection operation of a connection status between a host end and a hot-swappable storage device of an embodiment of the invention. In FIG. 7, an electronic apparatus 700 includes a host end 710 and a hot-swappable storage device 720. The host end 710 includes a connector 711, a wireless communication interface 712, a processor 714, and a detection component 713. The detection component 713 may be disposed in the controller of the host end 710. The hot-swappable storage device 720 includes a connector 721, a wireless communication interface 722, a detection component 723, a wireless signal processing component 7212, an input-output control component 7211, and a signal expander component 7213. In particular, the detection component 723, the wireless signal processing component 7212, the input-output control component 7211, and the signal expander component 7213 may be disposed in the controller of the hot-swappable storage device 720.

In the present embodiment, the detection component 713 includes a comparator CMP1 and resistors R11, R12, and R13. The resistors R11 and R12 are coupled in series between a power supply voltage VCC and a reference voltage GND, and configured to divide the power supply voltage VCC to generate a reference voltage VR1. The resistor R13 is coupled between the power supply voltage VCC and the connector 711. The positive input end of the comparator CMP1 receives the reference voltage VR1, and the negative input end of the comparator CMP1 is coupled to the connector 711 and the resistor R13.

Moreover, the detection component 723 includes a comparator CMP2 and resistors R21, R22, and R23. The resistors R21 and R22 are coupled in series between a power supply voltage VCC and the reference voltage GND, and configured to divide the power supply voltage VCC to generate a reference voltage VR2. The resistor R23 is coupled between the connector 721 and the reference voltage GND. The negative input end of the comparator CMP2 receives the reference voltage VR2, and the positive input end of the comparator CMP2 is coupled to the connector 721 and the resistor R23.

When the connectors 711 and 721 are electrically connected, a voltage V1 may be generated at the connection end of the connectors 711 and 721. In particular, the connectors 711 and 721 are electrically connected to each other, and the resistors R13 and R23 may form a resistor string and be configured to divide the power supply voltage VCC to generate the voltage V1. At the same time, the comparator CMP1 may compare the voltage V1 with the reference voltage VR1 to generate a comparison result CR1, and the comparator CMP2 may compare the voltage V1 with the reference voltage VR2 to generate a comparison result CR2. The comparison results CR1 and CR2 may be provided to the processor 714 and the wireless signal processing component 7212, respectively, and the host end 710 and the hot-swappable storage device 720 may perform an interface setting or switching operation of a corresponding data transfer.

Moreover, when the connectors 711 and 721 are disconnected, the resistor R13 on the negative input end of the comparator CMP1 is a pull-up resistor, and the voltage received by the negative input terminal of the comparator CMP1 may be equal to the power supply voltage VCC. The resistor R23 on the positive input end of the comparator CMP2 is a pull-down resistor, and the voltage received by the positive input end of the comparator CMP2 may be equal to the reference voltage GND. In this way, the comparison results CR1 and CR2 respectively generated by the comparators CMP1 and CMP2 may be changed and configured to notify the host end 710 and the hot-swappable storage device 720 to perform the interface switching operation of the corresponding data transfer.

The comparison result CR2 may be provided to the input-output control component 7211 and the signal expander component 7213. The input-output control component 7211 may determine whether to perform the transfer operation of the data SAS1 with the signal expander component 7213 according to the comparison result CR2. The signal expander component 7213 may also determine whether to perform a transfer and receiving operation of the data SAS1 with the input-output control component 7211 or perform a transfer and receiving operation of the data SAS2 with the wireless signal processing component 7212 according to the comparison result CR2. In particular, when the comparison result CR2 indicates that the connectors 711 and 721 are connected to each other, a transfer and receiving operation of the data SAS1 is performed between the signal expander component 7213 and the input-output control component 7211. On the contrary, when the comparison result CR2 indicates that the connectors 711 and 721 are disconnected from each other, a transfer and receiving operation of the data SAS2 is performed between the signal expander component 7213 and the wireless signal processing component 7212. The data SAS1 is sent via the connectors 711 and 721.

The details of the interface switching operations performed by the host end 710 and the hot-swappable storage device 720 are described in detail in the plurality of embodiments and implementations above, and are not repeated herein.

Based on the above, in the invention, a wireless communication interface is additionally provided at the host end and the hot-swappable storage device, and the wireless communication interface is used to perform a data transfer operation when the hot-swappable storage device needs to be pulled out for maintenance. The stability of the data transfer operation between the host end and the hot-swappable storage device may be maintained, thus improving the work efficiency of the electronic apparatus.

What is claimed is:

1. A hot-swappable storage device, comprising:
   a carrier configured to carry a plurality of storage components;
   a connector disposed on the carrier and configured to be electronically connected to a host end for performing a data transfer operation;
   a controller disposed in the carrier and coupled to the storage components, wherein the controller detects a connection status continuously between the connector and the host end after a device connection operation; and
   a wireless communication interface disposed on the carrier and determining to perform the data transfer operation with the host end when the connection status is disconnected,
   wherein the controller receives a repair request signal sent by the host end and makes the wireless communication interface perform the device connection operation with the host end for performing the data transfer operation continuously according to the repair request signal before the host end being disconnected with the connector,
   wherein the controller comprises:
   an input-output control component coupled to the connector and configured to transfer a transfer data of a Peripheral Component Interconnect Express;
   a wireless signal processing component coupled to the wireless communication interface and configured to transfer a wireless transfer data; and
   a signal expander component coupled to the input/output control component, the wireless signal processing component and the storage components, and the signal expander performs a transfer and receiving operation of the transfer data or the wireless transfer data; and
   a detection component coupled to the input-output control component, the wireless signal processing component, the signal expander component and the connector, and configured to detect the connection status of the connector and the host end.

2. The storage device of claim 1, wherein when the connector is disconnected from the host end, the wireless communication interface performs the data transfer operation with the host end.

3. The storage device of claim 1, wherein the connector performs the data transfer operation with the host end via a Serial Attached SCSI or a Peripheral Component Interconnect Express.

4. The storage device of claim 1, wherein the signal expander component coupled to the connector and the wireless communication interface and configured to transfer the transfer data of a Serial Attached SCSI via the connector or transfer the wireless transfer data via a target controller component and the wireless communication interface.

5. The storage device of claim 1, wherein the wireless communication interface performs the data transfer operation via visible light communication, wireless communication, or Bluetooth communication.

6. An electronic apparatus, comprising:
   a host end, comprising:
   a first connector;
   a first controller configured to detect a connection status of the first connector; and a first wireless communication interface determining whether to initiate a data transfer operation according to the connection status; and a hot-swappable storage device, comprising:
- a carrier configured to carry a plurality of storage components;
- a second connector configured to be electrically connected to the first connector of the host end for performing the data transfer operation;
- a second controller disposed in the carrier and coupled to the storage components, wherein the second controller continuously detects a connection status of the second connector and the first connector after a device connection operation; and
- a second wireless communication interface disposed on the carrier and determining to perform the data transfer operation with the host end according to the connection status, wherein the connection status is disconnected, wherein the first controller detects the connection status of the first connector and the second connector, wherein the second controller receives a repair request signal sent by the host end and makes the second wireless communication interface perform the device connection operation with the first wireless communication interface of the host end for performing the data transfer operation continuously according to the repair request signal before the host end being disconnected with the second connector, wherein the second controller comprises:
an input-output control component coupled to the second connector and configured to transfer a transfer data of a Peripheral Component Interconnect Express;
a wireless signal processing component coupled to the wireless communication interface and configured to transfer a wireless transfer data; and
a signal expander component coupled to the input/output control component, the wireless signal processing component and the storage components, and the signal expander performs to perform a transfer and receiving operation of the transfer data or the wireless transfer data; and
a first detection component coupled to the input-output control component, the wireless signal processing component, the signal expander component and the second connector, and configured to detect the connection status of the second connector of the hot-swappable storage device and the first connector of the host end.

7. The electronic apparatus of claim 6, wherein the first controller comprises:
a second detection component coupled to the first connector and configured to detect the connection status of the first connector and the second connector.

8. The electronic apparatus of claim 7,
wherein when the first connector and the second connector are electrically connected, a first voltage is generated at an end point at which the first connector and the second connector are connected, and the first detection component and the second detection component determine the connection status of the first connector and the second connector by comparing the first voltage and a reference voltage.

9. The electronic apparatus of claim 6, wherein when the second connector is disconnected from the first connector of the host end, the second wireless communication interface performs the data transfer operation with the host end via the first wireless communication interface.

10. The electronic apparatus of claim 6, wherein the first wireless communication interface and the second wireless communication interface perform the data transfer operation via visible light communication, wireless communication, or Bluetooth communication.

* * * * *